US007380891B2

United States Patent
Ohashi et al.

(10) Patent No.: US 7,380,891 B2
(45) Date of Patent: Jun. 3, 2008

(54) POWER SUPPLY APPARATUS FOR VEHICLE

(75) Inventors: Toshihiko Ohashi, Hirakata (JP); Yousuke Mitani, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/524,335

(22) PCT Filed: Jul. 1, 2004

(86) PCT No.: PCT/JP2004/009686

§ 371 (c)(1),
(2), (4) Date: Feb. 11, 2005

(87) PCT Pub. No.: WO2005/002927

PCT Pub. Date: Jan. 13, 2005

(65) Prior Publication Data

US 2005/0269870 A1 Dec. 8, 2005

(30) Foreign Application Priority Data

Jul. 8, 2003 (JP) .............................. 2003-193426

(51) Int. Cl.
*B60T 13/66* (2006.01)
(52) U.S. Cl. ............ 303/199; 303/122.05; 303/122.08; 324/548
(58) Field of Classification Search ................ 303/199, 303/155, 122.08, 122.05; 320/166, 127; 320/132; 324/548, 678
See application file for complete search history.

(56) References Cited

U.S. PATENT DOCUMENTS

| 5,339,017 | A * | 8/1994 | Yang ......................... 320/127 |
| 5,627,325 | A * | 5/1997 | Lew et al. ................ 73/861.56 |
| 6,356,086 | B1 * | 3/2002 | Cook et al. .................. 324/659 |
| 6,956,355 | B2 * | 10/2005 | Vaillancourt et al. ........ 320/132 |
| 7,148,697 | B2 * | 12/2006 | Doljack ...................... 324/548 |
| 2004/0187674 | A1 * | 9/2004 | Bennett et al. ................ 91/418 |

FOREIGN PATENT DOCUMENTS

| JP | 02-175351 | 7/1990 |
| JP | 05-116571 | 5/1993 |
| JP | 08-094684 | 4/1996 |
| JP | 2001-114039 | 4/2001 |
| JP | 2002-151366 | 5/2002 |
| JP | 2002-325377 | 11/2002 |

* cited by examiner

OTHER PUBLICATIONS

International Search Report for application No. PCT/JP2004/009686 dated Sep. 21, 2004.

*Primary Examiner*—Bradley T King
(74) *Attorney, Agent, or Firm*—RatnerPrestia (57) ABSTRACT

A power supply apparatus for a vehicle. An electronic controller outputs information for controlling braking of a vehicle. A battery supplies electric power to a brake via the electronic controller. A power supply backup unit as an auxiliary power supply includes a capacitor unit formed of a plurality of capacitors and a detection unit for detecting an abnormality in the capacitor unit, and supplies electric power to the brake when the battery is in an abnormal state. In charging or discharging the capacitor unit, the detection unit measures an internal resistance value of the capacitor unit, and measures an internal capacitance value from the rate of change of voltage per unit time. The detection unit judges whether or not the capacitor unit is in a normal state based on the internal resistance value and the internal capacitance value.

9 Claims, 6 Drawing Sheets

120# POWER SUPPLY APPARATUS FOR VEHICLE

THIS APPLICATION IS A U.S. NATIONAL PHASE APPLICATION OF PCT INTERNATIONAL APPLICATION PCT/JP2004/009686.

TECHNICAL FIELD

The present invention relates to a power supply apparatus for a vehicle mounted in a vehicle such as a hybrid car, an electric vehicle, and the like. In particular, it relates to a power supply apparatus for a vehicle for braking a vehicle electrically.

BACKGROUND ART

Recently, hybrid cars and electric vehicles have been rapidly developed. Accordingly, braking of a vehicle has been rapidly developed from conventional mechanical braking toward electrical braking, and various proposals have been made.

In general, in order to electrically control a vehicle, a battery is used as its power supply. In this case, if electric power cannot be supplied from this battery due to some causes, the vehicle cannot be controlled with only this battery. Therefore, some configurations are equipped with an auxiliary battery as an auxiliary power supply in addition to the battery for the case of emergency.

As a prior art document with regard to this application, for example, Japanese Patent Unexamined Publication No. H05-116571 is known.

In this type of power supply apparatus for a vehicle, since an auxiliary power supply is responsible for braking of a vehicle in an emergency, it is extremely important to supply electric power from the auxiliary power supply reliably in an emergency. Therefore, it is important to surely predict the lifetime of the auxiliary power supply and to detect a state of the auxiliary power supply at any time.

However, herein, if a battery is used also as the auxiliary power supply, it is very difficult to predict the lifetime of the battery for the auxiliary power supply. Furthermore, as to the state of the battery, although a voltage can be checked, it is difficult to detect an abnormal state only from the voltage. Therefore, conventionally, the battery has been replaced by a new one earlier than usual so as to secure higher safety. However, even if the battery is replaced by a new one earlier than usual, it is difficult to check the state of the battery every day or every time the vehicle is started to move. Thus, further improvement in safety has been required.

SUMMARY OF THE INVENTION

A power supply apparatus for a vehicle of the present invention has a following configuration.

In order to control brakes, an electronic controller outputs information for controlling braking of a vehicle based on at least one of information provided from a brake pedal and information provided in response to a moving state of the vehicle.

A battery supplies electric power to the brakes via the electronic controller.

An auxiliary power supply includes a power supply backup unit having a capacitor unit formed of a plurality of capacitors and a detection unit for detecting an abnormality in the capacitor unit, and supplies electric power to the brakes via the electronic controller when the battery is in an abnormal state.

Herein, in charging or discharging the capacitor unit, the detection unit measures an internal resistance value of the capacitor unit, and measures an internal capacitance value of the capacitor unit from the rate of change of voltage per unit time of the capacitor unit. The detection unit judges whether or not the capacitor unit is in a normal state based on the measured internal resistance value and internal capacitance value.

Thus, since the capacitor unit is used as the auxiliary power supply, the lifetime as the auxiliary power supply is significantly extended, so that it can be extended to substantially the same level as the lifetime of the vehicle. As a result, a maintenance-free power supply backup unit can be realized. Furthermore, in charging or discharging, the internal resistance value is calculated from the voltage of the capacitor unit, and the internal capacitance value is calculated from the rate of change of voltage. Thereby, it is possible to measure the internal resistance value and the internal capacitance value of the capacitor unit more precisely. Thus, it is possible to judge whether or not the capacitor unit is in a normal state.

DETAILED DESCRIPTION OF PREFERRED EMBODIMENTS

Hereinafter, the embodiment of the present invention is described with reference to drawings.

Figure 1:
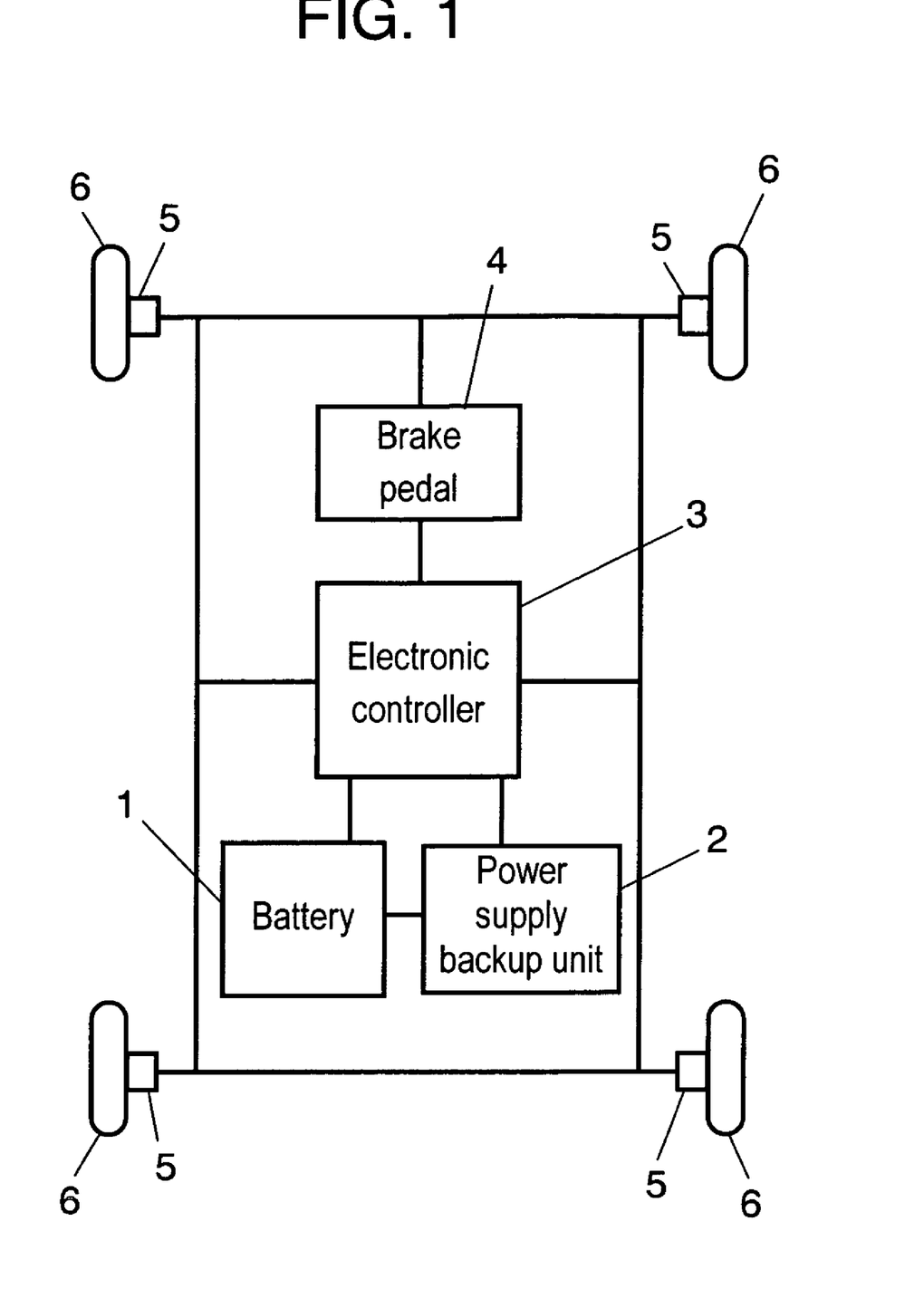
FIG. 1 shows a configuration of a power supply apparatus for a vehicle in an embodiment of the present invention.

FIG. 1 shows a configuration of a power supply apparatus for a vehicle in an embodiment of the present invention.

In FIG. 1, 12V battery 1 supplies electric power into a vehicle. As an auxiliary power supply to battery 1, power supply backup unit 2 is provided. Further, electronic controller 3 outputting information for controlling braking of the vehicle is provided. From both battery 1 and power supply backup unit 2, electric power is supplied to electronic controller 3. Furthermore, brake pedal 4 for transmitting information for controlling braking of the vehicle to electronic controller 3 is provided. Electronic controller 3 controls brakes 5 based on the information from brake pedal 4. With brakes 5, wheels 6 are braked.

The following is an explanation of a detailed configuration of a power supply apparatus for a vehicle of this embodiment.

Figure 2:
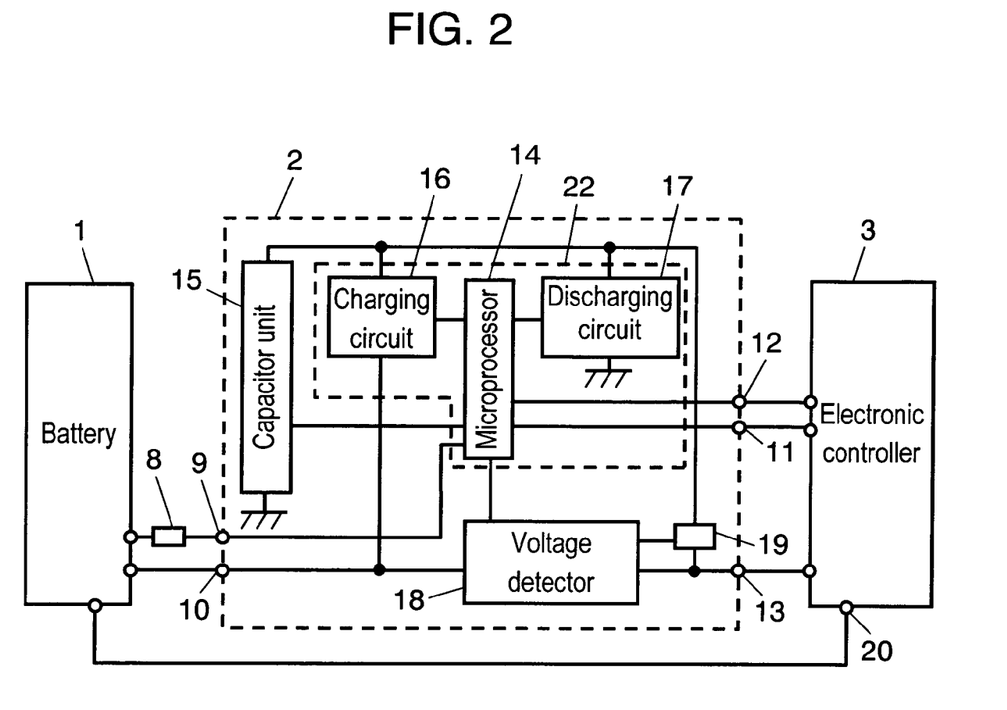
FIG. 2 is a circuit diagram of a power supply apparatus for a vehicle in an embodiment of the present invention.

FIG. 2 is a circuit diagram showing a power supply apparatus for a vehicle in an embodiment of the present invention.

In FIG. 2, battery 1 is connected to IG (ignition generator) terminal 9 provided on power supply backup unit 2 via ignition switch 8 for starting and terminating an operation of a vehicle, and also connected to +BC terminal 10 provided on power supply backup unit 2. +BC terminal 10 is a terminal for supplying electric power to power supply backup unit 2. Ignition switch 8 is provided for starting or terminating an operation of a vehicle. Furthermore, battery 1 is connected to power supply terminal 20 for supplying electric power to electronic controller 3.

Power supply backup unit 2 and electronic controller 3 are connected to each other via communication input terminal 11, communication output terminal 12 and OUT terminal 13.

Herein, communication input terminal 11 is a terminal for inputting signals from electronic controller 3 to power supply backup unit 2. Communication output terminal 12 is a terminal for outputting signals from power supply backup unit 2 to electronic controller 3. OUT terminal 13 is a terminal for outputting a voltage detected by a backup detector in power supply backup unit 2 or outputting electric charges stored in power supply backup unit 2 when battery 1 is in an abnormal state.

Herein, a configuration of power supply backup unit 2 is described.

Power supply backup unit 2 is an auxiliary power supply for supplying electric power to brakes 5 via electronic controller 3 when battery 1 is in an abnormal state. Power supply backup unit 2 includes capacitor unit 15.

Capacitor unit 15 is formed of a plurality of capacitors, for example, configured by connecting a plurality of electric double layer capacitors capable of charging and discharging rapidly. Furthermore, power supply backup unit 2 includes charging circuit 16 for charging capacitor unit 15 and discharging circuit 17 for discharging capacitor unit 15. These are controlled based on an instruction from microprocessor 14. Charging circuit 16 includes a constant-current controller (not shown) in order to keep voltage increase in capacitor unit 15 in charging nearly constant.

Power supply backup unit 2 includes voltage detector 18, as a first detection unit, for detecting a voltage output from battery 1. Furthermore, FET switch 19 is connected to voltage detector 18. FET switch 19 enables discharging electronic controller 3 from capacitor unit 15 via OUT terminal 13 when voltage detector 18 detects an abnormality in voltage.

Furthermore, power supply backup unit 2 includes detection unit 22, as a second detection unit, for detecting an abnormality in capacitor unit 15 based on the charging and discharging behavior. Detection unit 22 includes microprocessor 14, charging circuit 16 and discharging circuit 17.

The following is an explanation of an operation of a power supply apparatus for a vehicle.

Firstly, in order to start an operation of a vehicle, for example, when ignition is turned ON, ignition switch 8 connecting between battery 1 and IG terminal 9 is turned ON. Then, battery 1 supplies 12V of voltage to power supply backup unit 2 and electronic controller 3. Electronic controller 3 inputs a charge permission signal, which permits charging from battery 1 to capacitor unit 15, to power supply backup unit 2 via communication input terminal 11. Microprocessor 14 receives the charge permission signal and sends a command of charge permission to charging circuit 16. When charging is permitted, electric charges are charged from battery 1 to capacitor unit 15 via +BC terminal 10 and charging circuit 16. The charged electric charges are to be supplied to electronic controller 3 when the voltage of battery 1 is lowered, or when battery 1 is in an abnormal state.

On the other hand, the voltage output from battery 1 via +BC terminal 10 is detected by a sensor provided in voltage detector 18 and output to OUT terminal 13. At this time, if the voltage applied from battery 1 is a standard value (9.5 V) or more, it is confirmed that the voltage from battery 1 and the operation of power supply backup unit 2 are in a normal state. Then, electric power is continuously supplied from battery 1 to electronic controller 3.

Thus, the vehicle can operate normally. During a normal operation, when brake pedal 4 shown in FIG. 1 is operated, electronic controller 3 inputs information from brake pedal 4 and, based on the input information, outputs information for controlling braking of the vehicle to brakes 5. Then, in accordance with the output information, brakes 5 are operated, making it possible to brake wheels 6 reliably. Consequently, it is possible to control a vehicle reliably.

Thereafter, when ignition is turned OFF in order to terminate the operation of the vehicle, ignition switch 8 is turned OFF and electric power supply from battery 1 is stopped. At this time, microprocessor 14 transmits a signal for instructing discharging electric charges stored in capacitor unit 15 to discharging circuit 17. Then, based on this signal, discharging circuit 17 discharges electric charges stored in capacitor unit 15.

The following is an explanation of an operation of the power supply apparatus for a vehicle when the voltage of battery 1 is lowered or is in an abnormal state.

When the vehicle is started to operate, electric charges are charged from battery 1 to capacitor unit 15. A voltage applied from battery 1 to power supply backup unit 2 is detected by voltage detector 18. Power supply backup unit 2 outputs the detected voltage from OUT terminal 13. Thus, electric power is supplied from battery 1 to electronic controller 3. Herein, voltage detector 18 is provided with a sensor for detecting an abnormality in battery 1. Thereby, when the voltage detected by this sensor is less than the standard value (9.5 V), voltage detector 18 detects that the voltage output from battery 1 is abnormal.

Based on the information in which an abnormality is detected, FET switch 19, which is basically turned OFF when battery 1 is in a normal state, is turned ON. At this time, discharging from capacitor unit 15 to OUT terminal 13 is possible and supplying of electric power from battery 1 is stopped. Then, voltage detector 18 outputs a signal, in response to the stop of supplying of electric power from battery 1, to microprocessor 14. Microprocessor 14 instructs discharging circuit 17 to discharge electric charges stored in capacitor unit 15. In accordance with this instruction, electric charges stored in capacitor unit 15 are output to OUT terminal 13 via FET switch 19 and supplied to electronic controller 3.

Furthermore, this information on abnormality is transmitted from microprocessor 14 to electronic controller 3 via communication output terminal 12 and is displayed inside the vehicle. For example, information that battery 1 is in an abnormal state is displayed. Thereby, a driver is instructed to stop a vehicle immediately. In this way, when an abnormality is detected, since electric charges stored in capacitor unit 15 are supplied to electronic controller 3 as an emergency power supply, a driver can operate brakes 5 from brake pedal 4 via electronic controller 3, so that the driver can stop the vehicle safely.

Furthermore, during an operation of the vehicle, when second detection unit 22 detects an abnormality in capacitor unit 15, microcomputer 14 transmits the abnormality in capacitor unit 15 to electronic controller 3 via communication output terminal 12. Thereby, as in the time when battery 1 is in an abnormal state, it is displayed that capacitor unit 15 is in an abnormal state. Thereby, a driver can request a garage to carry out inspection, exchange, etc. of capacitor unit 15.

Hereinafter, a method for detecting an abnormality in capacitor unit 15 is described with reference to drawings.

Figure 3:
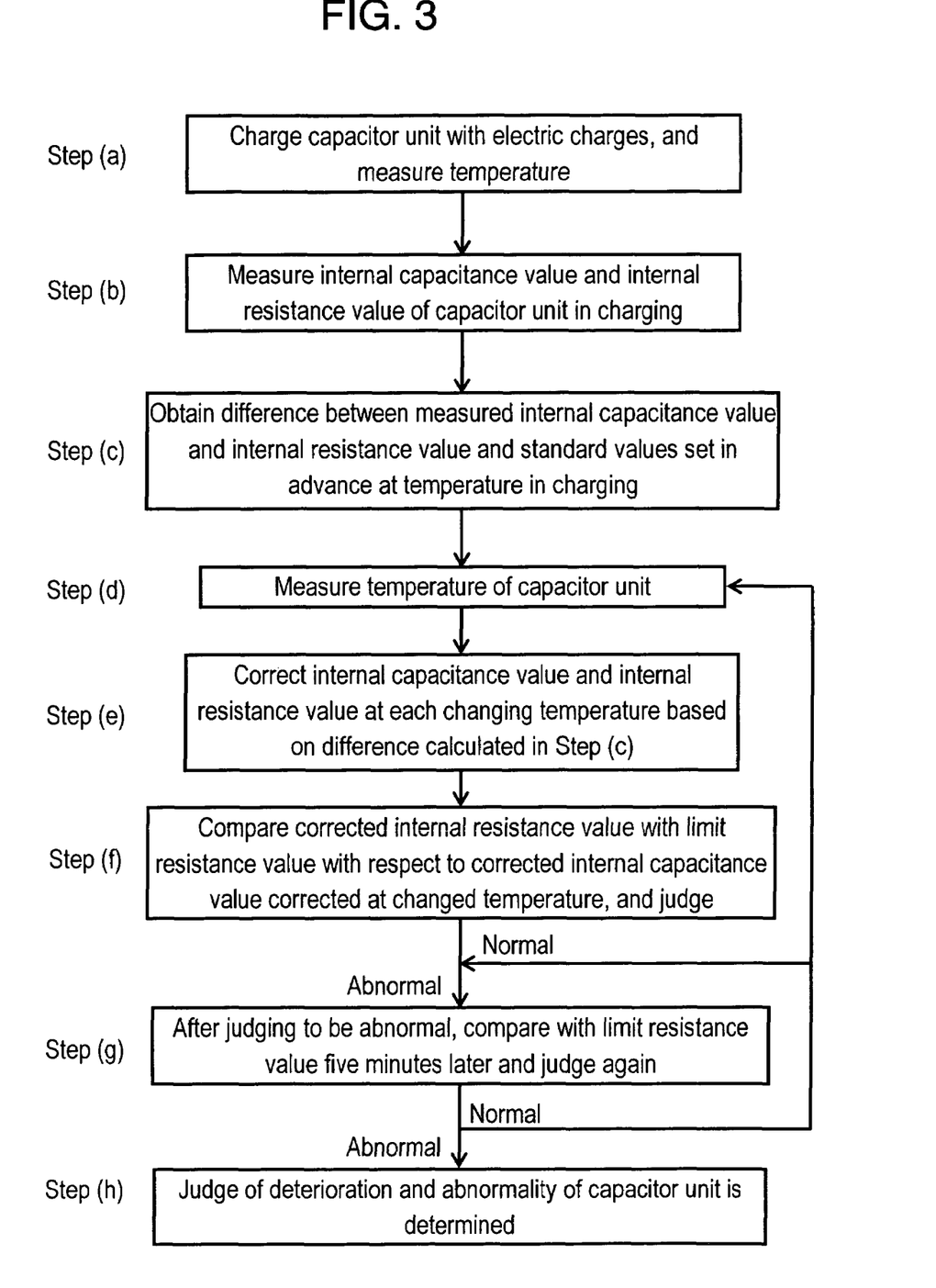
FIG. 3 is a flow chart of judging deterioration and abnormality in a capacitor unit in an embodiment of the present invention.

FIG. 3 is a flow chart that shows judging deterioration and abnormality in capacitor unit 15.

Figure 4A:
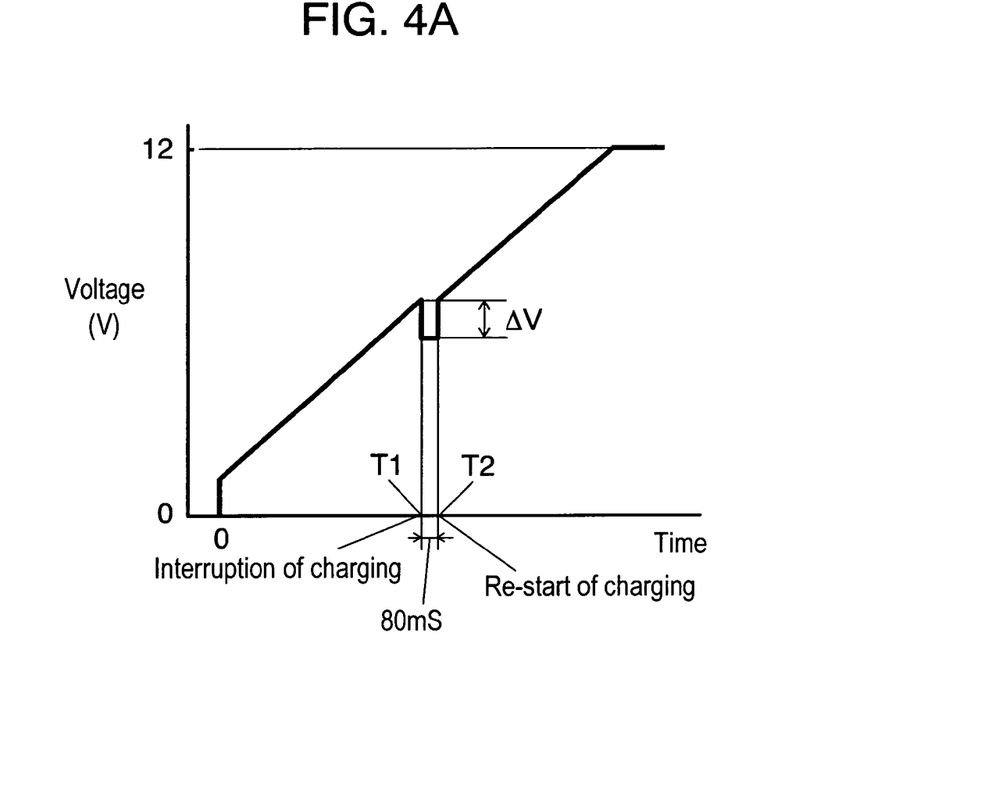
FIG. 4A shows a voltage value of a capacitor unit in charging in an embodiment of the present invention.

FIG. 4A shows a voltage of capacitor unit 15 in charging.

Figure 4B:
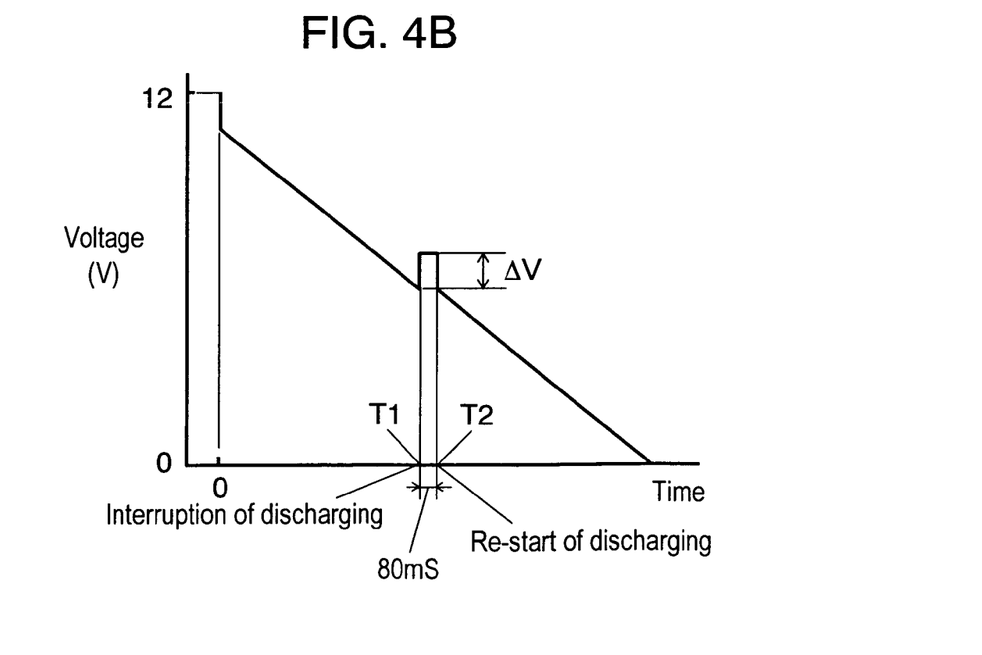
FIG. 4B shows a voltage value of a capacitor unit in discharging in an embodiment of the present invention.

FIG. 4B shows a voltage of capacitor unit 15 in discharging.

Figure 5A:
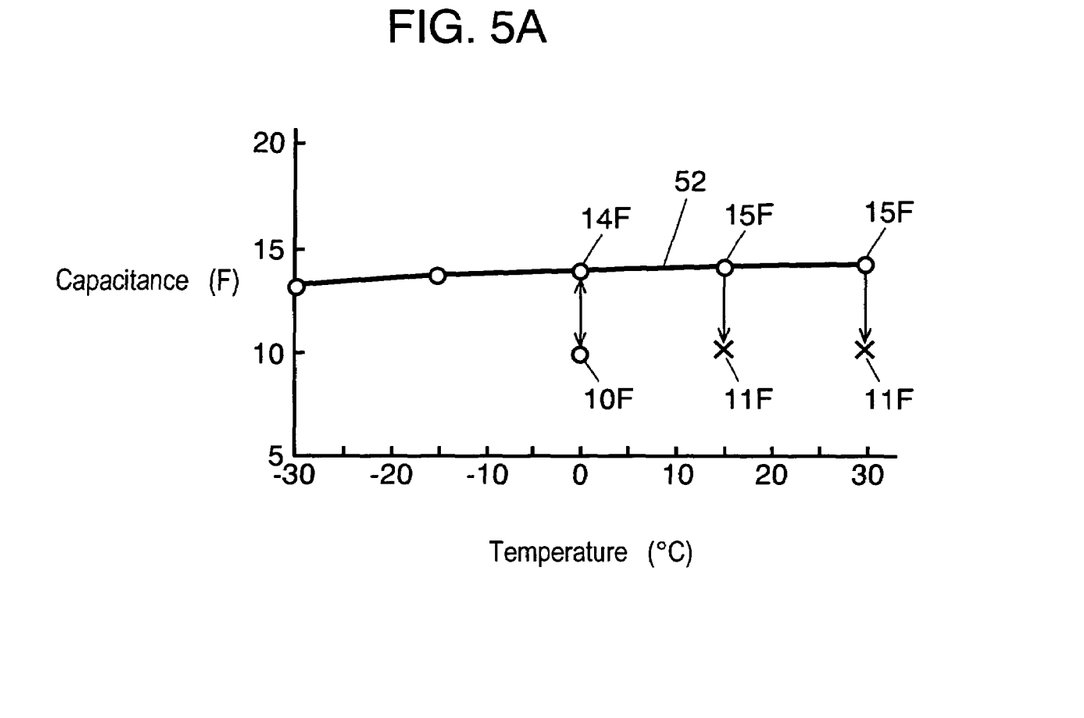
FIG. 5A shows standard internal capacitance values of a capacitor unit in an embodiment of the present invention.

FIG. 5A shows line 52 plotting standard values of the internal capacitance values, which were set in advance at respective temperatures, of capacitor unit 15.

Figure 5B:
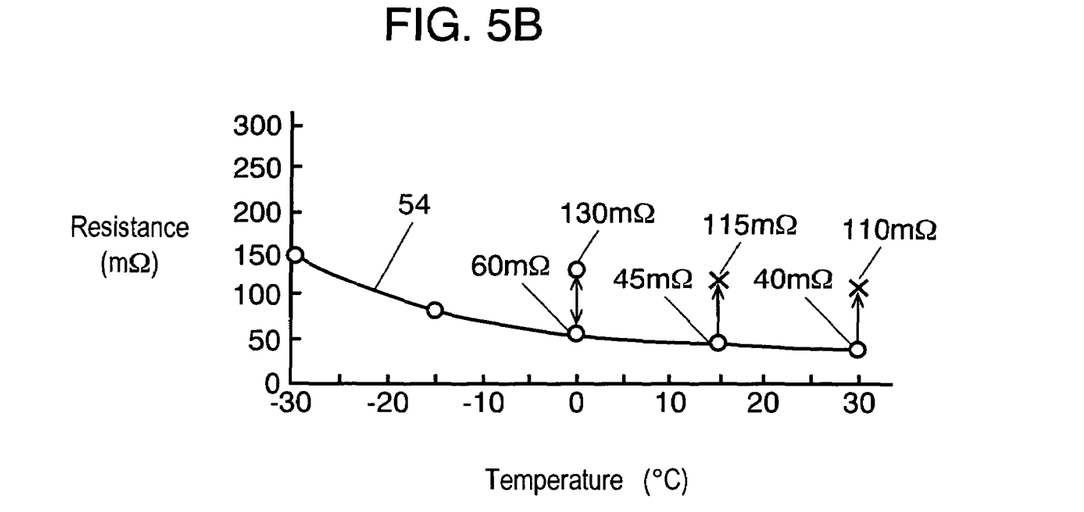
FIG. 5B shows standard internal resistance values of a capacitor unit in an embodiment of the present invention.

FIG. 5B shows line 54 plotting standard values of the internal resistance values, which were set in advance at respective temperatures, of capacitor unit 15.

Figure 6:
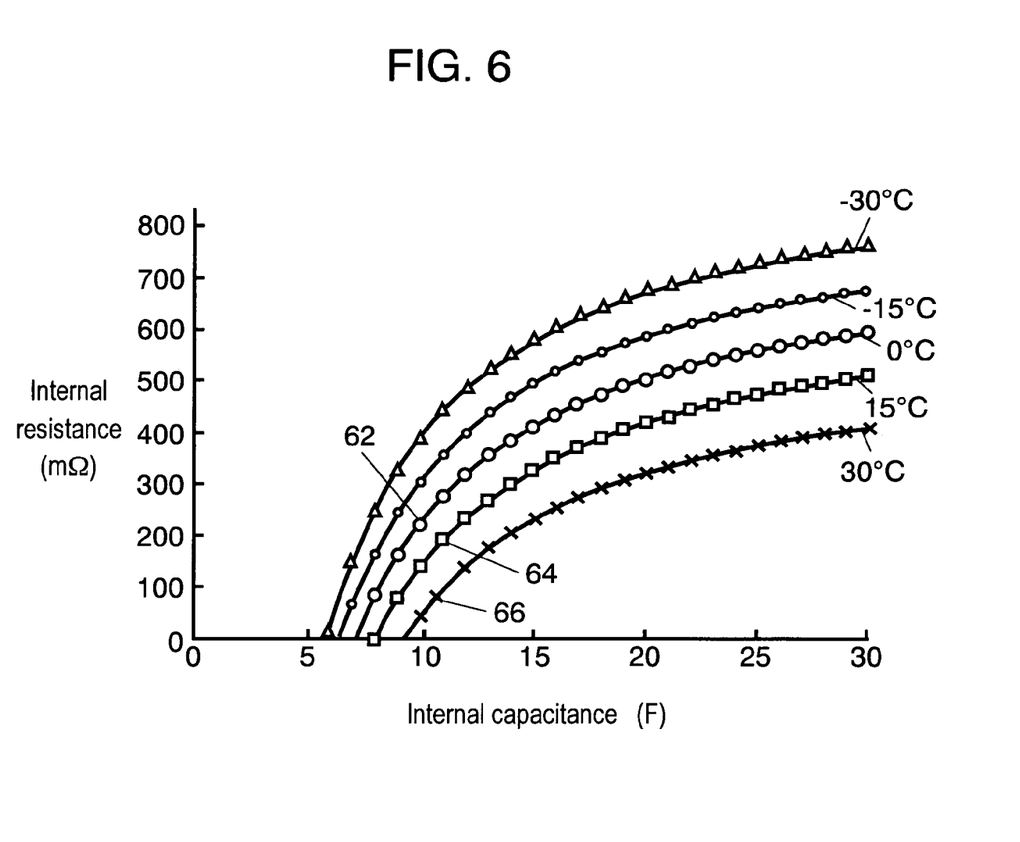
FIG. 6 shows limit values of internal resistance values with respect to internal capacitance values of a capacitor unit in an embodiment of the present invention.

FIG. 6 shows limit values of the internal resistance values with respect to the internal capacitance values of capacitor unit 15, which were set in advance at respective temperatures.

Hereinafter, an example of this embodiment is described based on values calculated in FIGS. 5A and 5B.

When the vehicle is started to operate, capacitor unit 15 starts to be charged, and temperatures are measured (Step (a) in FIG. 3).

From the time charging is started, voltage detector 18 detects voltages charged in capacitor unit 15. In order to precisely measure the internal resistance value of capacitor unit 15 in charging, charging is interrupted for a predetermined time during charging, i.e. from time T1 to T2 for, for example, about 80 ms.

As shown in FIG. 4A, the voltage of capacitor unit 15, which increased by charging, drops by interrupting charging. Voltage detector 18 detects a difference ΔV between the voltage when charging is interrupted and the dropped voltage.

From the difference ΔV in voltages and a current value in charging, the internal resistance value of capacitor unit 15 is calculated. After charging is interrupted for 80 ms, charging is re-started. When voltage detector 18 detects that 12V is charged in capacitor unit 15, charging is completed.

The internal capacitance value of capacitor unit 15 is calculated by measuring the rate of change of voltage per unit time in charging. At that time, even if capacitor unit 15 is charged with a constant current, the rate of change of voltage is not always constant due to the nonlinearity of the capacitor. That is to say, voltage does not change always linearly. Therefore, in order to calculate more precise rate of change of voltage, the rate of change of voltage, voltage and electric current are measured multiple times repeatedly at predetermined intervals, for example, every one second. From an average value of these measured values, the internal capacitance value and the internal resistance value are calculated (Step (b) in FIG. 3).

In an example of this embodiment, as shown in FIG. 5A and FIG. 5B, during charging, capacitor unit 15 has an internal resistance value of 130 mΩ, an internal capacitance value of 10 F and a temperature of 0° C.

The internal capacitance value and the internal resistance value of capacitor unit 15 after charging can be estimated from the temperature of capacitor unit 15 when measurement is carried out. The estimating method is described hereinafter.

In charging capacitor unit 15, the following values are calculated (Step (c) in FIG. 3).
(1) As shown in FIG. 5A, a difference between the internal capacitance value (10 F) of capacitor unit 15 obtained during charging and the standard internal capacitance value (14 F) at a temperature during charging (0° C.).
(2) As shown in FIG. 5B, a difference between the internal resistance value (130 mΩ) of capacitor unit 15 obtained in charging and the standard internal resistance value (60 mΩ) of capacitor unit 15 at a temperature in charging (0° C.).

As shown in FIGS. 5A and 5B, the difference in the internal capacitance values is 4 F and the difference in the internal resistance values is 70 mΩ.

The measurement of temperatures of capacitor unit 15 is carried out at any time (Step (d) in FIG. 3).

Therefore, from the difference (4 F) in the internal capacitance values and the difference (70 mΩ) in the internal resistance values obtained as mentioned above, the internal capacitance value and the internal resistance value of capacitor unit 15 are corrected at each changed temperatures (Step (e) in FIG. 3).

Then, the corrected internal capacitance value and internal resistance value are compared with the limit resistance values with respect to the internal capacitance values of capacitor unit 15 set at respective temperatures shown in FIG. 6. Thus, it is judged whether or not capacitor unit 15 is deteriorated, i.e., whether or not capacitor unit 15 is in a normal state (Step (f) in FIG. 3).

This judge is carried out every five minutes.

When this judge is made, in a case where the internal resistance value of capacitor unit 15 does not exceed the limit value shown in FIG. 6, it is judged that capacitor unit 15 is in a normal state. In a case where the internal resistance value exceeds the limit value, it is judged that capacitor unit 15 is deteriorated and in an abnormal state. At that time, it is displayed inside a vehicle that capacitor unit 15 is in an abnormal state.

Herein, when it is judged that capacitor unit 15 is in a normal state, the step returns to step (d).

In this embodiment, the internal capacitance values and the internal resistance values when the temperature of capacitor unit 15 is changed from 0° C. to 15° C. and to 30° C. are shown in FIG. 5A and FIG. 5B, respectively.

From the above-mentioned difference (4 F) in the internal capacitance values and the difference (70 mΩ) in the internal resistance values, the internal capacitance value of 11 F and the internal resistance value of 115 mΩ at a temperature of 15° C., and the internal capacitance value of 11 F and the internal resistance value of 110 mΩ at a temperature of 30° C. are obtained.

These obtained values and the limit values are described with reference to FIG. 6.

In this embodiment, as shown in FIG. 6, the limit values with respect to the obtained value are described below.

At a temperature of 0° C., with respect to 10 F and 130 mΩ, the limit value is 230 mΩ as shown by reference numeral 62;

at a temperature of 15° C., with respect to 11 F and 115 mΩ, the limit value is 180 mΩ as shown by reference numeral 64; and at a temperature of 30° C., with respect to 11 F and 130 mΩ, the limit value is 80 mΩ as shown by reference numeral 66.

Consequently, it is judged that capacitor unit 15 is in a normal state at 0° C. and 15° C. and in an abnormal state at 30° C.

Herein, when it is judged that the capacitor unit 15 is in an abnormal state, measurement is carried out again 5 minutes later (Step (g) in FIG. 3).

At this time, if it is judged again that capacitor unit 15 is in an abnormal state, it is determined that capacitor unit 15 is deteriorated and in an abnormal state (Step (h) in FIG. 3). At this time, it is displayed inside a vehicle that capacitor unit 15 is in an abnormal state due to deterioration, and thus the abnormality is notified to a driver.

If it is judged that capacitor unit 15 is in a normal state at the time of re-measurement, the step returns to step (d) in FIG. 3 and measurement is continued. Then, it is judged again whether or not the capacitor unit 15 is deteriorated, i.e., whether or not the capacitor unit 15 is in a normal state.

Note here that in this embodiment, charging was interrupted and then the internal resistance value was obtained from the dropped value $\Delta V$ of voltage right after the interruption. Alternatively, the internal resistance value may be obtained from the increased voltage right after charging is re-started or at the time charging is started.

Furthermore, in this embodiment, a method of measuring by charging the capacitor unit was described. Alternatively, as shown in FIG. 4B, measuring may be carried out by discharging the capacitor unit. In the case of the method shown in FIG. 4B, the internal resistance value of the capacitor unit is obtained from the increase $\Delta V$ in voltage due to the interruption of discharging for 80 ms from time T1 to T2.

As mentioned above, according to this embodiment, every time the power supply backup unit is charged or discharged, the internal capacitance value and the internal resistance value of the capacitor unit are measured precisely. Furthermore, by comparing the limit values of the internal resistance values at temperatures when the measurement is carried out with the internal resistance values obtained by measuring or correcting, the deterioration of the capacitor unit can be confirmed every time the capacitor unit is charged. Consequently, it is possible to obtain a power supply backup unit with high reliability with respect to temperature change and to obtain a power supply apparatus for a vehicle with a high safety.

INDUSTRIAL APPLICABILITY

A power supply apparatus for a vehicle including a power supply backup unit as an auxiliary power supply using a capacitor unit formed of a plurality of capacitors is provided. Even when a battery is in an abnormal state, electric power can be reliably supplied to an electronic controller by the auxiliary power supply. In addition, it is possible to confirm an operation of the power supply backup unit and the deterioration of the capacitor unit every time a vehicle is started to operate. Therefore, a power supply apparatus for a vehicle with high reliability and safety having a power supply backup unit with high reliability is provided. It can be used as a power supply apparatus for a vehicle used for braking a vehicle by an electric control, for example, as a power supply apparatus for a vehicle mounted in hybrid cars or electric vehicles, etc.

The invention claimed is:

1. A power supply apparatus, comprising:
   a capacitor unit formed of a plurality of capacitors;
   a microprocessor unit for interrupting charging after a start of charging or interrupting discharging after a start of discharging of the capacitor unit in measuring an internal resistance value of the capacitor unit; and
   a detection unit for measuring the internal resistance value of the capacitor unit based on at least one of:
   1) a current value in the charging; and one of i) a voltage decrease when the charging is interrupted by the microprocessor unit or ii) a voltage increase when the charging is restarted after the interruption of the charging by the microprocessor unit, wherein in measuring the internal resistance value of the capacitor unit, the charging is interrupted when a voltage across the capacitor is increasing over a period of time during charging, or
   2) a current value in the discharging; and one of i) a voltage increase when the discharging is interrupted by the microprocessor unit or ii) a voltage decrease when the discharging is restarted after the interruption of the discharging by the microprocessor unit, wherein in measuring the internal resistance value of the capacitor unit, the discharging is interrupted when a voltage across the capacitor is decreasing over a period of time during discharging.

2. The power supply apparatus according to claim 1, wherein the detection unit measures temperature of the capacitor unit in the charging or the discharging, corrects an internal capacitance value of the capacitor unit and the internal resistance value at each temperature based on a capacitance value difference and a resistance value difference between each of the measured internal capacitance value and the measured internal resistance value and each of a standard internal capacitance value and a standard internal resistance value of the capacitor unit, which are initialized in advance, at the temperature measured in the charging or the discharging, and judges whether or not the capacitor unit is in a normal state by comparing the corrected internal resistance value with a limit internal resistance value with respect to the corrected internal capacitance value, at the each temperature.

3. The power supply apparatus according to claim 2, wherein a rate of change of voltage per unit time of the capacitor unit in charging or discharging is measured multiple times every predetermined time.

4. The power supply apparatus according to claim 1, wherein a rate of change of voltage per unit time of the capacitor unit in charging or discharging is measured multiple times every predetermined time.

5. The power supply apparatus according to claim 1, wherein the detection unit measures an internal capacitance value of the capacitor unit from a composite rate of change of voltage per unit time of the capacitor unit based on a plurality of different rates of change of voltage per unit time.

6. The power supply apparatus according to claim 5, wherein the composite rate of change of voltage per unit time is an average of the plurality of different rates of change of voltage per unit time.

7. A power supply apparatus according to claim 1, wherein said power supply apparatus is for a vehicle and is for use with a battery, wherein said battery is for supplying electric power to a brake of the vehicle.

8. A power supply apparatus according to claim 1, further comprising:
   an electronic controller for outputting information for controlling braking of the vehicle to a brake based on at least one of information from a brake pedal and information in response to a moving state of the vehicle.

9. A power supply apparatus according to claim 1, wherein the detection unit measures an internal capacitance value of the capacitor unit from a rate of change of voltage per unit time of the capacitor unit in charging or discharging, and the detection unit detects an abnormality in the capacitor unit based on the measured internal resistance value and internal capacitance value.

* * * * *